United States Patent
Kim et al.

(10) Patent No.: US 9,321,455 B2
(45) Date of Patent: Apr. 26, 2016

(54) SYSTEM AND METHOD FOR OPENING ENGINE CLUTCH OF HYBRID VEHICLE

(71) Applicants: Hyundai Motor Company, Seoul (KR); Kia Motors Corporation, Seoul (KR)

(72) Inventors: Sang Joon Kim, Seoul (KR); Dong Ho Yang, Gyeongsangnam-do (KR); Sung Deok Kim, Gyeonggi-do (KR); Joonyoung Park, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/569,713

(22) Filed: Dec. 14, 2014

(65) Prior Publication Data
US 2016/0059848 A1    Mar. 3, 2016

(30) Foreign Application Priority Data
Sep. 1, 2014   (KR) ................. 10-2014-0115235

(51) Int. Cl.
| | |
|---|---|
| *B60L 9/00* | (2006.01) |
| *B60L 11/00* | (2006.01) |
| *B60W 20/00* | (2006.01) |
| *B60W 10/02* | (2006.01) |
| *B60W 10/06* | (2006.01) |
| *B60W 10/08* | (2006.01) |

(52) U.S. Cl.
CPC ............. *B60W 20/40* (2013.01); *B60W 10/02* (2013.01); *B60W 10/06* (2013.01); *B60W 10/08* (2013.01); *Y10S 903/93* (2013.01)

(58) Field of Classification Search
CPC ..... B60W 10/06; B60W 10/08; B60W 20/40; B60W 10/02; Y10S 903/93
USPC .......................................................... 701/22
See application file for complete search history.

(56) References Cited

U.S. PATENT DOCUMENTS

| | | | | |
|---|---|---|---|---|
| 6,077,186 A * | 6/2000 | Kojima | .................... | B60K 6/48 180/65.25 |
| 6,430,483 B2 * | 8/2002 | Takaoka | .................. | B60K 6/48 180/65.1 |
| 8,620,509 B2 * | 12/2013 | Park | ...................... | B60W 10/06 475/5 |
| 2002/0179348 A1 * | 12/2002 | Tamai | .................. | F02D 41/062 180/65.25 |
| 2008/0132379 A1 * | 6/2008 | Matsubara | ............... | B60K 6/40 477/3 |
| 2008/0319594 A1 * | 12/2008 | Shibata | .................. | B60K 6/485 701/22 |
| 2009/0227409 A1 * | 9/2009 | Ito | .......................... | B60K 6/445 475/5 |
| 2010/0286858 A1 * | 11/2010 | Otokawa | ................ | B60K 6/365 701/22 |
| 2012/0143421 A1 * | 6/2012 | Park | ....................... | F16H 63/50 701/22 |

(Continued)

FOREIGN PATENT DOCUMENTS

| | | |
|---|---|---|
| JP | 2007-083796 A | 4/2007 |
| JP | 2013-023155 A | 2/2013 |
| KR | 10-1393800 B1 | 5/2014 |

*Primary Examiner* — Behrang Badii
*Assistant Examiner* — Daniel L Greene
(74) *Attorney, Agent, or Firm* — Mintz Levin Cohn Ferris Glovsky and Popeo, P.C.; Peter F. Corless

(57) ABSTRACT

A system and method for opening an engine clutch of a hybrid vehicle are provided. The method and system enhance fuel efficiency by saving a fuel injection amount based on a fuel injection time of an engine, by adjusting an input torque of an engine clutch to be zero by applying a Hybrid Starter Generator (HSG) torque connected to the engine while reducing the fuel injection time into the engine from the time when the opening of the engine clutch starts to adjust.

15 Claims, 5 Drawing Sheets

(56) References Cited

U.S. PATENT DOCUMENTS

| | | | | |
|---|---|---|---|---|
| 2013/0053214 A1* | 2/2013 | Kawai | ................... | B60W 10/02 477/5 |
| 2013/0282213 A1* | 10/2013 | Park | ..................... | B60W 10/06 701/22 |
| 2013/0284125 A1* | 10/2013 | Zollner | ................... | B60K 6/48 123/2 |
| 2013/0325231 A1* | 12/2013 | Park | ..................... | B60W 20/10 701/22 |
| 2014/0172212 A1* | 6/2014 | Park | ..................... | B60W 20/40 701/22 |
| 2014/0172213 A1* | 6/2014 | Park | ..................... | B60W 20/20 701/22 |
| 2014/0371961 A1* | 12/2014 | Kim | ..................... | B60W 10/02 701/22 |
| 2015/0183424 A1* | 7/2015 | Kim | ..................... | B60W 20/40 701/22 |
| 2015/0232080 A1* | 8/2015 | Park | ..................... | B60W 10/08 701/22 |
| 2015/0329100 A1* | 11/2015 | Kim | ..................... | B60W 20/10 701/22 |
| 2015/0344025 A1* | 12/2015 | Park | ..................... | B60W 20/40 701/22 |

* cited by examiner

SYSTEM AND METHOD FOR OPENING ENGINE CLUTCH OF HYBRID VEHICLE

CROSS-REFERENCE TO RELATED APPLICATION

This application claims under 35 U.S.C. §119(a) the benefit of Korean Patent Application No. 10-2014-0115235 filed on Sep. 1, 2014, the entire contents of which are incorporated herein by reference.

BACKGROUND (a) Technical Field

The present invention relates to a method for opening an engine clutch of a hybrid vehicle. More particularly, the present invention relates to a method for more easily opening an engine clutch of a hybrid vehicle without a physical slip using a hybrid starter generator (HSG) torque converged to an engine friction torque.

(b) Background Art

A hybrid vehicle among environmentally-friendly vehicles is a vehicle which uses an engine and a motor as a power source to reduce exhaust gas and enhance fuel efficiency and includes a power transfer system which individually transfers power from the engine or power from the motor to a driving wheel or transfers power from both the engine and the motor to the driving wheel.

As illustrated in FIG. 1, a power transfer system for a hybrid vehicle according to the related art includes, for example, an engine 10 and a motor 12 which are disposed in series, an engine clutch 13 disposed between the engine 10 and the motor 12 to transfer or interrupt power of the engine, an automatic transmission 14 configured to shift power from the motor or power from both the motor and the engine to a driving wheel and output the power, a hybrid starter generator (HSG) 16 which is a type of motor connected to a crank pulley of the engine to start the engine and generate power, an inverter 18 configured to operate the motor and controls power generation, a high voltage battery 20 chargeably and dischargeably connected to the inverter to provide power to the motor 12, and the like.

The power transfer system for a hybrid vehicle is a type of system in which the motor is attached to the automatic transmission and is referred to as a transmission mounted electric device (TMED) and provides various driving modes, such as an electric vehicle (EV) mode which is a pure electric vehicle mode using only the power from the motor, a hybrid electric vehicle (HEV) mode using the engine as a main power source and the motor as an auxiliary power source, and a regenerative braking (RB) mode which recovers braking and inertial energy of a vehicle based on the power generation by the motor when the vehicle is driven by braking or inertia of the vehicle and charges the recovered braking and inertial energy in the battery.

In the HEV mode, the vehicle is driven by a sum of output torques of the engine and the motor when the engine clutch is locked-up. In the EV mode, the vehicle is driven by the output torque of the motor when the engine clutch is locked-up and opened. In particular, to prevent a physical slip from occurring, the engine clutch is required to be locked-up when an engine speed is synchronized with a motor speed during a driving mode shift from the EV mode to the HEV mode, while the engine clutch is required to be opened when an input shaft torque of the engine clutch is in a zero state during the driving mode shift from the HEV mode to the EV mode.

The engine speed is synchronized with the motor speed when the engine clutch is locked-up and the input shaft torque (hereinafter, input torque) of the engine clutch connected to the engine is adjusted to zero when the engine clutch is opened to prevent a physical slip of the input shaft of the engine clutch with respect to the output shaft of the engine clutch connected to the motor side.

In particular, the reason for adjusting the input torque of the engine clutch be zero (0) to prevent the physical slip from occurring when the engine clutch is opened is as follows. First, it may be difficult to compensate for a slip rate of the engine clutch in the motor side by accurately estimating a change in a transfer torque of the engine clutch during the slip of the engine clutch and second, since the slip of the engine clutch occurs when an absolute value of the input torque of the engine clutch is greater than torque capacity by pressure (e.g., oil pressure) applied to the engine clutch, the input torque of the engine clutch is required to be zero when the pressure of the engine clutch is opened.

A method for opening an engine clutch according to the related art will be described below with reference to FIG. 2. To prevent the physical slip of the engine clutch, the related art maintains fuel injection into the engine from the time when an opening of the engine clutch starts to adjust until the engine torque, that is, an input torque of the engine clutch becomes zero (0) and opens the locked-up pressure (oil pressure) of the engine clutch (E/C) when the input torque of the engine clutch becomes zero to open the engine clutch.

In particular, the input torque of the engine clutch becomes zero after a predetermined time lapses due to a friction torque (e.g., torque generated by a friction force generated from each sliding portion of the engine) of the engine when the engine is operated in a low torque area due to the fuel injection into the engine. When the engine clutch is opened, the fuel injection into the engine stops.

However, the method for opening an engine clutch according to the related art has the following problems. Usually, it is known that operation efficiency of the engine approaches an optimal operating line (OOL) and thus the operation efficiency of the engine is sufficient, while it is known that operation efficiency of the low torque area of the engine is distant from the optimal operating line and thus the operating efficiency thereof is substantially reduced.

Therefore, the operation of the engine is maintained in the low torque area by maintaining the fuel injection into the engine from the time when the opening of the engine clutch starts to adjust until the engine clutch is opened, during the shift from the HEV mode to the EV mode, which may be a cause of the reduction in fuel efficiency depending on fuel consumption.

The above information disclosed in this section is merely for enhancement of understanding of the background of the invention and therefore it may contain information that does not form the prior art that is already known in this country to a person of ordinary skill in the art.

SUMMARY

The present invention provides a system and a method for opening an engine clutch of a hybrid vehicle to improve fuel efficiency by saving a fuel injection amount based on a fuel injection time of an engine, by adjusting an input torque of an engine clutch to be zero using an HSG torque connected to the engine while reducing the fuel injection time into the engine from the time when the opening of the engine clutch starts to adjust.

In one aspect, the present invention provides a method for opening an engine clutch of a hybrid vehicle which may include applying an opening control signal for an engine clutch to shift an HEV mode to an EV mode; driving an HSG with a torque converged to a friction torque of an engine while stopping fuel injection into the engine, when the opening of the engine clutch starts to adjust; and opening locked-up pressure of the engine clutch to open the engine clutch, when an input torque of the engine clutch becomes zero by converging a driving torque of the HSG connected to the engine to the friction torque of the engine.

In an exemplary embodiment, the method may further include: when the opening of the engine clutch is completed, ending a torque control for the HSG. In addition, after a fuel injection sustaining period of which a decreasing gradient of an engine torque based on a starting point at which the opening of the engine clutch starts to adjust is maintained, the fuel injection into the engine may stop.

Further, the HSG may be driven while an increasing gradient of the torque converges with the friction torque of the engine, during the fuel injection sustain period based on the starting point at which the opening of the engine clutch starts to adjust. A control may be performed to adjust a sum of a decreasing gradient of the engine torque and an increasing gradient of the HSG torque to become the friction torque of the engine, during the fuel injection sustaining period based on the starting point at which the opening of the engine clutch starts to adjust.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
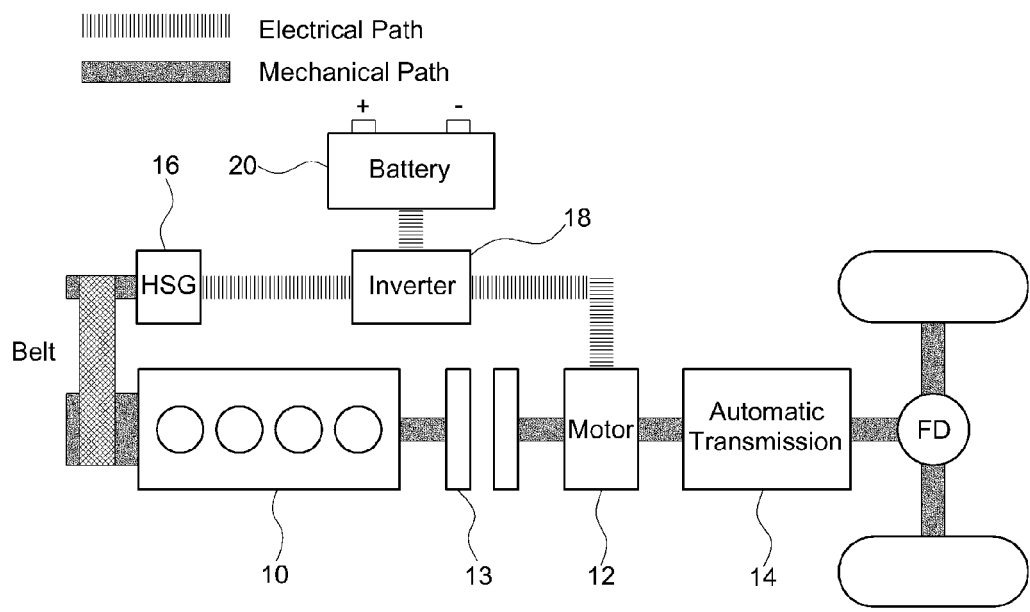
FIG. 1 is an exemplary diagram illustrating a configuration of a power transfer system of a hybrid vehicle according to the related art.
Figure 2:
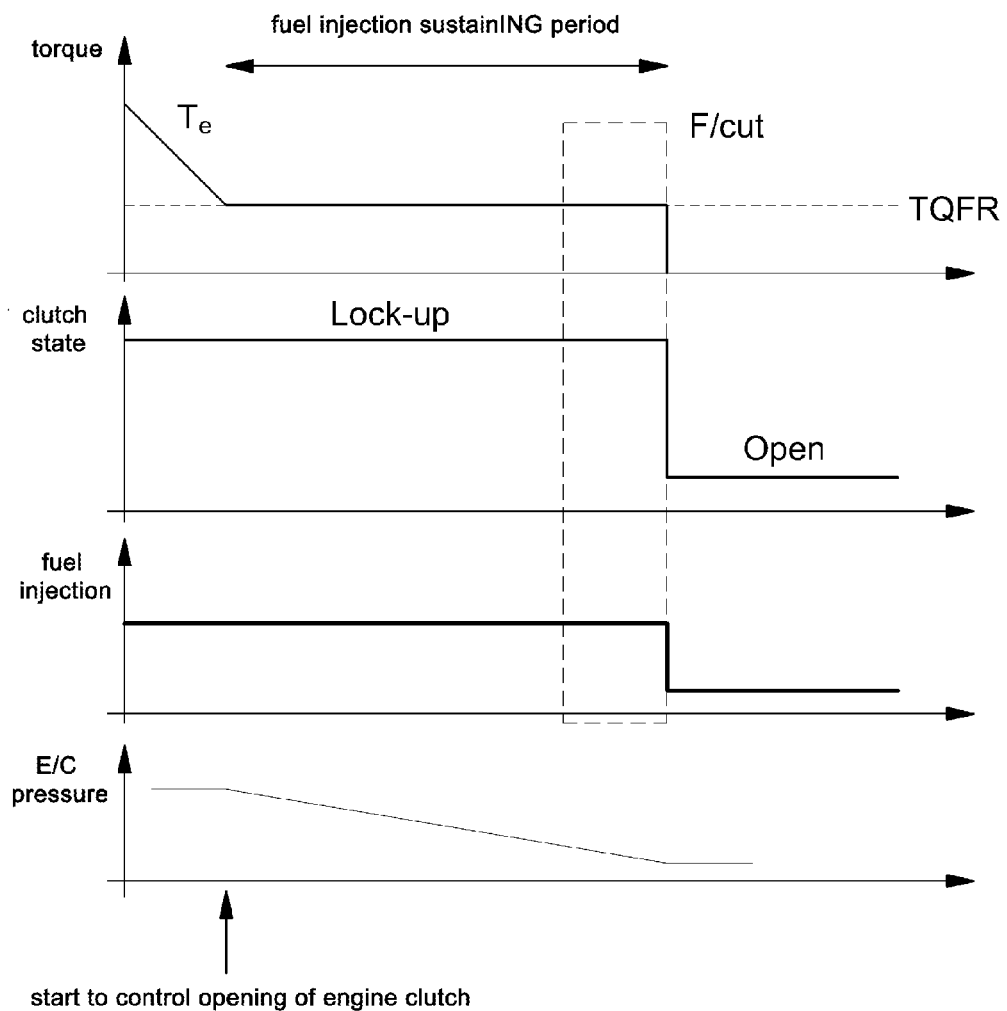
FIG. 2 is an exemplary control diagram illustrating a method for opening an engine clutch of a hybrid vehicle according to the related art.

Reference numerals set forth in the Drawings includes reference to the following elements as further discussed below:

10: engine
12: motor
13: engine clutch
14: automatic transmission
16: HSG
18: inverter
20: battery It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Hereinafter, exemplary embodiments of the present invention will be described in detail with reference to the accompanying drawings.

A shift between an EV mode and an HEV mode of a hybrid vehicle and a repetitive operation of locking-up and opening of an engine clutch based on the shift are frequently performed during city driving (e.g., driving in an urban environment), such that a fuel injection maintenance condition for an engine during the opening of the engine clutch as described above is one of the fuel efficiency reduction causes.

Therefore, according to the exemplary embodiment of the present invention, it may be possible to enhance fuel efficiency based on saving of a fuel injection amount into the engine, by adjusting an input torque of the engine clutch to be zero by driving an HSG connected to the engine while reducing a fuel injection time into the engine from the time when the opening of the engine clutch starts to adjust.

Figure 3:
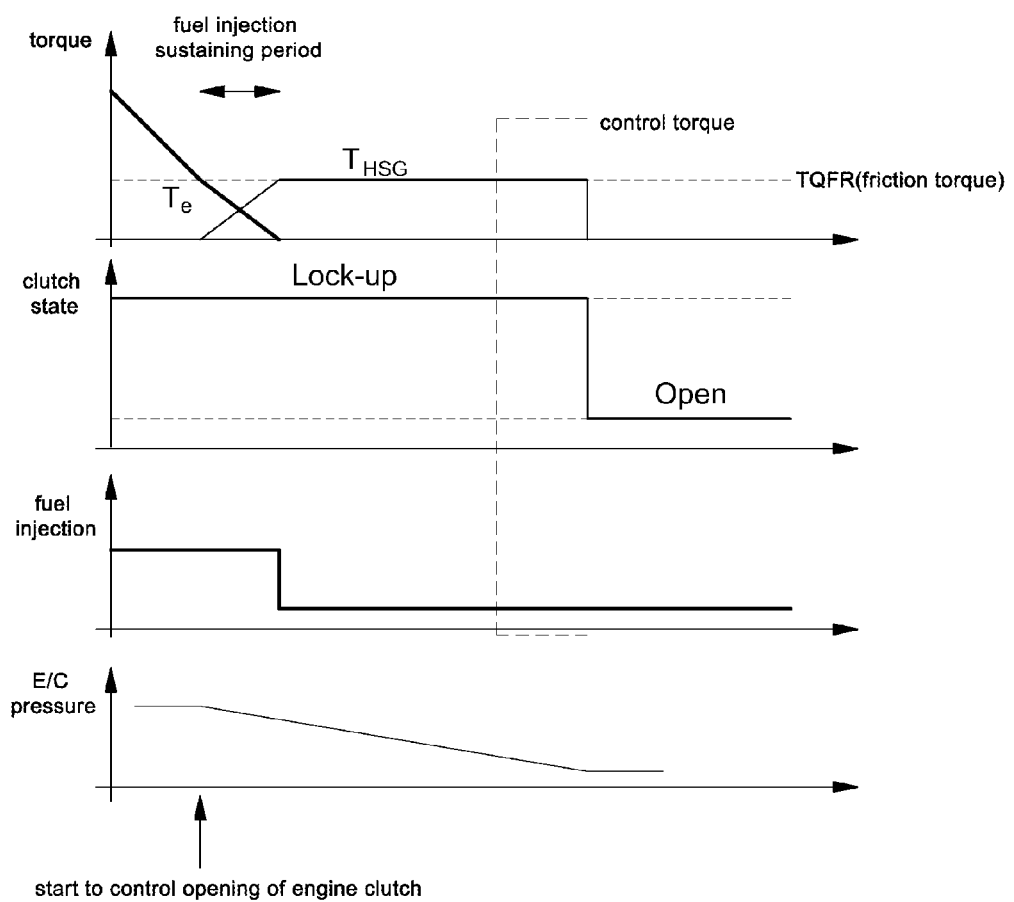
FIG. 3 is an exemplary control diagram illustrating a method for opening an engine clutch of a hybrid vehicle according to an exemplary embodiment of the present invention.
Figure 4:
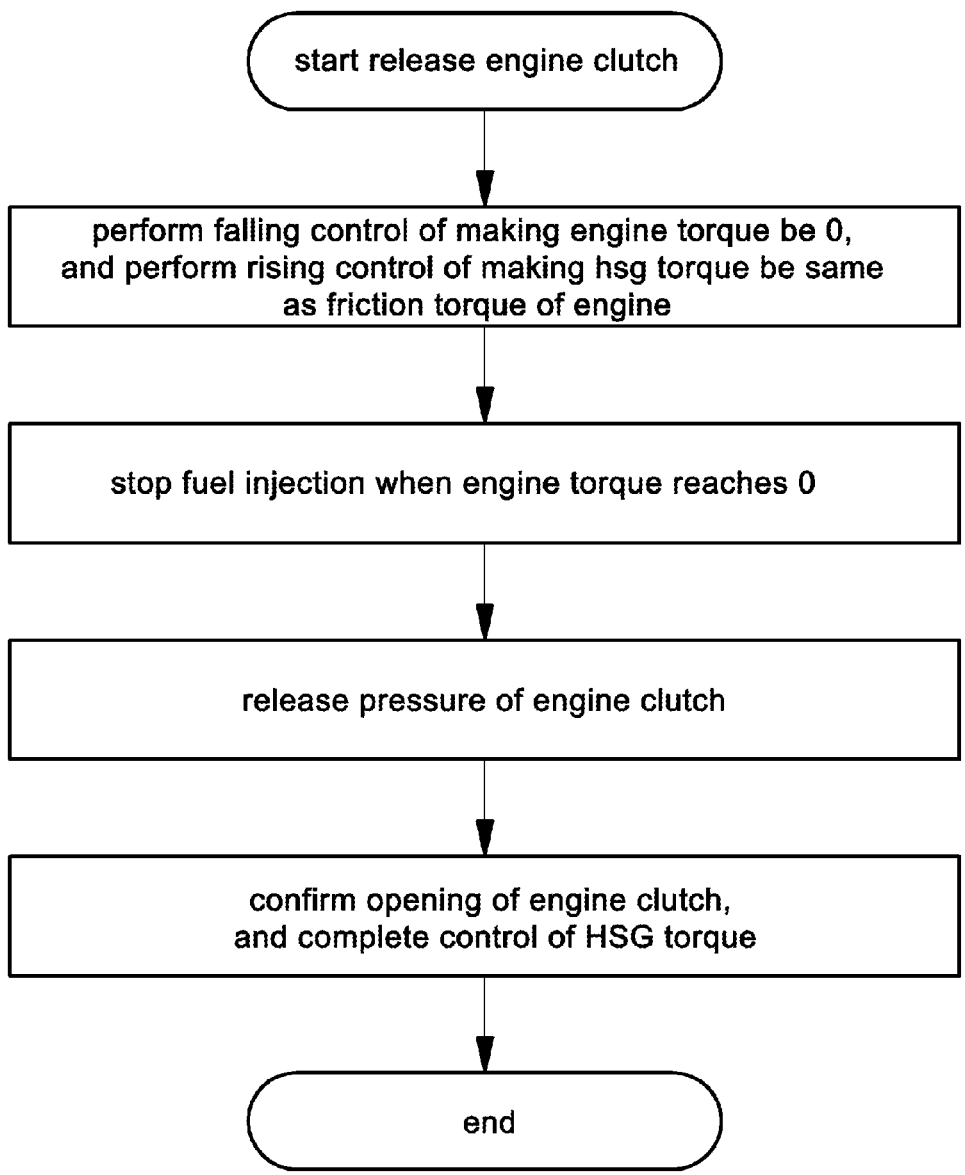
FIG. 4 is an exemplary flow chart illustrating the method for opening an engine clutch of a hybrid vehicle according to the exemplary embodiment of the present invention.

In particular, a method for opening an engine clutch according to an exemplary embodiment of the present invention will be described below with reference to the accompanying FIGS. 3 and 4. The method of the present invention may be executed by a controller having a processor and a memory. When the hybrid vehicle is driven in an HEV mode, the hybrid vehicle may be driven by a sum of output torques from the engine and a motor when the engine clutch is locked-up. When the HEV mode is shifted to an EV mode in which the vehicle is driven by the output torque of the motor, the locking-up and opening adjustment of the engine clutch may be performed.

When the opening of the engine clutch starts to adjust, the fuel injection into the engine may terminate. In other words, as illustrated in FIG. 3, when a torque instruction for the engine is adjusted to be zero (0) from the time when the opening of the engine clutch starts to adjust (e.g., when the engine clutch begins to open), a fuel injection sustain period having a decreasing gradient of the engine torque may be maintained based on a starting point at which the opening of the engine clutch starts to adjust and then the fuel injection may terminate.

In particular, even though the fuel injection into the engine terminates, since the engine clutch may be continuously connected to a driving motor side and the engine inertial force is present, the engine may be maintained in a continuously rotating state at a speed synchronized with a motor speed before the engine clutch is opened and a friction torque (e.g., torque indicated by TQFR in FIG. 3 and torque opposite to the engine torque) of the engine may be generated based on the rotation of the engine. When the opening of the engine clutch starts to adjust, the HSG connected to a crank shaft of the engine via a pulley and a belt to transfer power may be driven when the fuel injection into the engine terminates.

Instead of the engine, the HSG may be driven with a torque value converged with the friction torque of the engine and may be driven while having an increasing gradient that converges with the friction torque of the engine based on the starting point at which the opening of the engine clutch starts to adjust. In particular, as illustrated in FIG. 3, the increasing gradient period of the HSG torque may be maintained within the fuel injection sustain period (e.g., period having a substantially constant decreasing gradient based on the starting point at which the opening of the engine clutch starts to adjust) and the HSG torque may be maintained at a level converged with the friction torque (indicated by TQFR in FIG. 3) when passing through the fuel injection sustaining period.

Accordingly, a driving torque (e.g., torque in a positive (+) direction of the HSG) may be applied at a level converged to the engine friction torque (e.g., torque in a negative (−) direction) to adjust the input torque of the engine clutch to be zero instead of the engine torque while offsetting the friction torque of the engine.

Meanwhile, a sum of the decreasing gradient of the engine torque and the increasing gradient of the HSG torque in the fuel injection sustaining period may be adjusted to be about the same as the friction torque (TQFR) of the engine. In other words, in consideration of a pulley ratio for a belt connection between the HSG and the engine crank shaft, the sum of the decreasing gradient of the engine torque and the increasing gradient of the HSG torque in the fuel injection sustaining period may be adjusted to be about the same as the friction torque TQFR of the engine.

As described above, the driving torque of the HSG may be applied at the level converged with the friction torque of the engine to offset the friction torque of the engine, to cause the input shaft torque of the engine clutch connected to the engine output side to become zero. Further, the locked-up pressure (e.g., oil pressure) of the engine clutch may be opened when the input torque of the engine clutch becomes zero, and thus the engine clutch may be more easily opened without a physical slip. Finally, when the opening of the engine clutch is completed, the torque control for the HSG may terminate.

Figure 5:
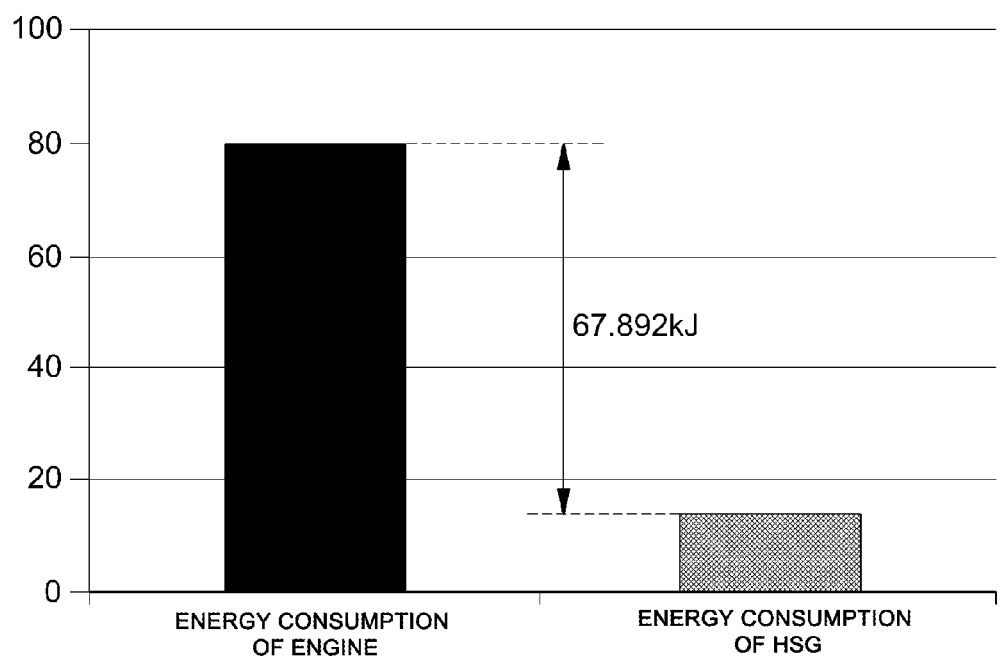
FIG. 5 is an exemplary graph illustrating an advantage in an energy consumption rate of the method for opening an engine clutch according to the exemplary embodiment of the present invention, as compared with the method for opening an engine clutch according to the related art.

FIG. 5 is an exemplary graph illustrating an advantage in respect to an energy consumption rate implementing the method for opening an engine clutch according to the exemplary embodiment of the present invention, as compared with the method for opening an engine clutch according to the related art. As illustrated in FIG. 5, in the related art, the operation of the engine is maintained in the low torque area by maintaining the fuel injection into the engine from the time when the opening of the engine clutch starts to adjust until the engine clutch is opened to increase the energy consumption of the engine, which is a cause of the reduction in fuel efficiency.

Furthermore, in the exemplary embodiment of the present invention which terminates the fuel injection into the engine from the time when the opening of the engine clutch starts to adjust and adjusts the input torque of the engine clutch to be zero using the HSG torque, the energy consumption of the HSG (e.g., electric energy of the battery) may be saved by about 67,892 kJ compared to the energy consumption of the engine and the fuel injection amount into the engine may be reduced, thereby improving fuel efficiency.

Accordingly, the exemplary embodiments of the present invention provide the following effects. It may be possible to enhance the fuel efficiency by saving the fuel injection by reducing the fuel injection time of the engine, by adjusting the input torque of the engine clutch to be zero by adjusting the HSG torque connected to the engine at the level converged with the friction torque value of the engine while terminating the fuel injection into the engine from the time when the opening of the engine clutch starts to adjust.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for opening an engine clutch of a hybrid vehicle, comprising:
    applying, by a controller, an opening control signal for an engine clutch to shift a hybrid electric vehicle (HEV) mode to an electric vehicle (EV) mode;
    driving, by the controller, a hybrid starter generator (HSG) with a torque converged with a friction torque of an engine while terminating fuel injection into the engine, when the opening of the engine clutch starts to adjust; and
    opening, by the controller, locked-up pressure of the engine clutch to open the engine clutch, when an input torque of the engine clutch becomes zero by converging a driving torque of the HSG connected to the engine to the friction torque of the engine.

2. The method of claim 1, further comprising:
    terminating, by the controller, a torque control for the HSG when the opening of the engine clutch is completed.

3. The method of claim 1, wherein after a fuel injection sustaining period having a decreasing gradient of an engine torque based on a starting point at which the opening of the engine clutch starts to adjust is maintained, the fuel injection into the engine terminates.

4. The method of claim 1, wherein the HSG is driven while having an increasing gradient of the torque which is converged with the friction torque of the engine, during the fuel injection sustaining period based on the starting point at which the opening of the engine clutch starts to adjust.

5. The method of claim 4, wherein a sum of a decreasing gradient of the engine torque and an increasing gradient of the HSG torque is adjusted to become the friction torque of the engine, during the fuel injection sustaining period based on the starting point at which the opening of the engine clutch starts to adjust.

6. A system for opening an engine clutch of a hybrid vehicle, comprising:
    a memory configured to store program instructions; and
    a processor configured to execute the program instructions, the program instructions when executed configured to:
        apply an opening control signal for an engine clutch to shift a hybrid electric vehicle (HEV) mode to an electric vehicle (EV) mode;
        drive a hybrid starter generator (HSG) with a torque converged with a friction torque of an engine while terminating fuel injection into the engine, when the opening of the engine clutch starts to adjust; and
        open locked-up pressure of the engine clutch to open the engine clutch, when an input torque of the engine clutch becomes zero by converging a driving torque of the HSG connected to the engine to the friction torque of the engine.

7. The system of claim 6, wherein the program instructions when executed are further configured to:
    terminate a torque control for the HSG when the opening of the engine clutch is completed.

8. The system of claim 6, wherein after a fuel injection sustaining period having a decreasing gradient of an engine torque based on a starting point at which the opening of the engine clutch starts to adjust is maintained, the fuel injection into the engine terminates.

9. The system of claim 6, wherein the HSG is driven while having an increasing gradient of the torque which is converged with the friction torque of the engine, during the fuel injection sustaining period based on the starting point at which the opening of the engine clutch starts to adjust.

10. The system of claim 9, wherein a sum of a decreasing gradient of the engine torque and an increasing gradient of the HSG torque is adjusted to become the friction torque of the engine, during the fuel injection sustaining period based on the starting point at which the opening of the engine clutch starts to adjust.

11. A non-transitory computer readable medium containing program instructions executed by a processor or controller, the computer readable medium comprising:
    program instructions that apply an opening control signal for an engine clutch to shift a hybrid electric vehicle (HEV) mode to an electric vehicle (EV) mode;
    program instructions that drive a hybrid starter generator (HSG) with a torque converged with a friction torque of an engine while terminating fuel injection into the engine, when the opening of the engine clutch starts to adjust; and
    program instructions that open locked-up pressure of the engine clutch to open the engine clutch, when an input torque of the engine clutch becomes zero by converging a driving torque of the HSG connected to the engine to the friction torque of the engine.

12. The non-transitory computer readable medium of claim 11 further comprising:
    program instructions that terminate a torque control for the HSG when the opening of the engine clutch is completed.

13. The non-transitory computer readable medium of claim 11, wherein after a fuel injection sustaining period having a decreasing gradient of an engine torque based on a starting point at which the opening of the engine clutch starts to adjust is maintained, the fuel injection into the engine terminates.

14. The non-transitory computer readable medium of claim 11, wherein the HSG is driven while having an increasing gradient of the torque which is converged with the friction torque of the engine, during the fuel injection sustaining period based on the starting point at which the opening of the engine clutch starts to adjust.

15. The non-transitory computer readable medium of claim 14, wherein a sum of a decreasing gradient of the engine torque and an increasing gradient of the HSG torque is adjusted to become the friction torque of the engine, during the fuel injection sustaining period based on the starting point at which the opening of the engine clutch starts to adjust.

* * * * *